United States Patent
Wilke et al.

(10) Patent No.: US 10,532,711 B2
(45) Date of Patent: Jan. 14, 2020

(54) REAR UNDERRUN PROTECTION SYSTEM FOR A VEHICLE

(71) Applicant: MAN Truck & Bus AG, München (DE)

(72) Inventors: Florian Wilke, München (DE); Aleksandar Bogicevic, München (DE); Mike Langhammer, München (DE); Stefan Marx, Landsberied (DE)

(73) Assignee: MAN TRUCK & BUS AG, München (DE)

( * ) Notice: Subject to any disclaimer, the term of this patent is extended or adjusted under 35 U.S.C. 154(b) by 0 days.

(21) Appl. No.: 15/851,945

(22) Filed: Dec. 22, 2017

(65) Prior Publication Data

US 2018/0178744 A1 Jun. 28, 2018

(30) Foreign Application Priority Data

Dec. 23, 2016 (DE) .......................... 10 2016 015 501

(51) Int. Cl.
*B60R 19/56* (2006.01)
*B60R 19/38* (2006.01)

(52) U.S. Cl.
CPC .............. *B60R 19/56* (2013.01); *B60R 19/38* (2013.01)

(58) Field of Classification Search
CPC ................................. B60R 19/56; B60R 19/38
See application file for complete search history.

(56) References Cited

U.S. PATENT DOCUMENTS

| | | | | |
|---|---|---|---|---|
| 1,761,994 A | * | 6/1930 | Shilling | B60R 19/48 180/271 |
| 6,520,469 B1 | | 2/2003 | DiMauro | |
| 2010/0156122 A1 | * | 6/2010 | Saitou | B60R 19/56 293/132 |
| 2013/0257068 A1 | * | 10/2013 | Nakazawa | B60R 19/56 293/103 |
| 2017/0057442 A1 | * | 3/2017 | Tang | B60R 19/56 |
| 2018/0126935 A1 | * | 5/2018 | Oliver | B60R 19/56 |

FOREIGN PATENT DOCUMENTS

| | | |
|---|---|---|
| DE | 20016473 U1 | 11/2000 |
| DE | 10330726 A1 | 2/2005 |
| DE | 202007015877 U1 | 2/2008 |
| JP | 2006088905 A | 4/2006 |
| WO | 2007080694 A1 | 7/2007 |
| WO | 2014125400 A2 | 8/2014 |

OTHER PUBLICATIONS

European Search Report dated May 15, 2018 and issued in corresponding European Patent Application No. 17208039.2.
German Search Report issued in corresponding application No. 102015015501.9 dated Sep. 14, 2017, 1 page.

* cited by examiner

*Primary Examiner* — Jason S Morrow
(74) *Attorney, Agent, or Firm* — Weber Rosselli & Cannon LLP

(57) ABSTRACT

An underrun protection system for arranging on a rear of a vehicle includes a crossmember and two support arms for supporting the crossmember and for mounting on a mounting structure of the vehicle. The underrun protection system further includes two connecting devices for mounting the crossmember on the support arms. The connecting devices serve as reinforcing parts for the partial reinforcement of the crossmember and/or the connecting devices are designed for adjustability along the crossmember.

15 Claims, 3 Drawing Sheets

REAR UNDERRUN PROTECTION SYSTEM FOR A VEHICLE

FIELD OF THE DISCLOSURE

The present disclosure relates to an underrun protection system for arranging on a rear of a vehicle, preferably a motor vehicle, for example a utility vehicle, in particular a heavy goods vehicle or an omnibus and/or a trailer therefor.

BACKGROUND

In the prior art, underrun protection systems for the rear of utility vehicles are known in very different embodiments. In the event of a road traffic accident, rear underrun protection systems are generally intended to prevent smaller vehicles (for example passenger motor vehicles, two-wheeled vehicles, etc.) from travelling under the utility vehicle from the rear, whereby there is a high risk for the occupants of the smaller vehicles of being injured or even killed. Rear underrun protection systems have to satisfy legal requirements (for example ECE R58). FIG. 6 shows a view from the rear of a rear underrun protection system known from the prior art, with a bending moment profile Mz which results from a horizontal load from the rear (for example an impact of another motor vehicle) at the testing point P1. The rear underrun protection system comprises a crossmember 2' and two support arms 3' for supporting the crossmember 2' and for mounting onto the utility vehicle. A drawback here is, in particular, the high bending moment load Mz at the transition between the crossmember 2' and the support arm 3'.

SUMMARY

An aspect of the present disclosure is to provide a more uniform and/or improved utilization of an underrun protection system crossmember, in particular with regard to the legally required test forces at legally required testing points (for example ECE R58).

in an aspect, advantageous developments of the present disclosure may be derived from the subclaims and the following description of embodiments of the present disclosure.

The present disclosure relates to an underrun protection system for arranging on a rear of a vehicle, preferably a motor vehicle, for example a utility vehicle, such as for example a heavy goods vehicle or an omnibus and/or a trailer therefor. The underrun protection system comprises a crossmember and two support arms for supporting the crossmember and for mounting on a mounting structure of the vehicle. The mounting structure may expediently be a vehicle chassis, in particular a longitudinal member and/or crossmember structure.

The underrun protection system is characterized, in particular, in that it comprises two connecting devices for the preferably releasable mounting of the crossmember on the support arms.

The connecting devices preferably serve as reinforcing parts for the partial mechanical reinforcement of the crossmember, in particular by increasing, for example at least doubling, the material thickness in the transition region between the crossmember and the support arms. Alternatively or additionally, the connecting devices preferably serve for the adjustability (for example the longitudinal adjustability) of the support arms along the crossmember.

It is also possible that the two support arms, for example, are extended outwardly to the side and thus preferably to the side in the longitudinal direction of the crossmember, preferably such that the spacing of the support arms on the crossmember is greater than the spacing of the support arms on the mounting structure.

x expediently characterizes the longitudinal direction/axis of the vehicle. y expediently characterizes the latitudinal direction/axis of the vehicle. z expediently characterizes the vertical direction/axis of the vehicle.

The extension of the support arms, therefore, expediently takes place at an angle to the xz-plane.

By the connecting devices and optionally the extension of the support arms outwardly to the side, a reduced bending moment Mz may be achieved about the z-axis in the transition region between the crossmember and the support arm, in particular as a result of a test force at the testing point P1 according to ECE R58.

As a result, a uniform and/or improved utilization of the crossmember may be possible, in particular with regard to the legally required test forces at legally required testing points (for example P1 and P3 according to ECE R58).

Generally, by the extension of the support arms outwardly to the side, in particular, an increased load-bearing capacity of the underrun protection system is produced at the testing point P1 and a reduced load bearing capacity is produced at the testing point P3 (see for example FIGS. 3 and 5).

It is possible that the support arms are extended to the rear relative to the vehicle.

It is also possible that the support arms extend downwardly from the mounting structure.

The support arms preferably extend obliquely between the crossmember and the mounting device.

It is possible that the respective connecting device has a front face and a rear face and a longitudinal extent and/or material thickness of the rear face is at least partially smaller than a longitudinal extent and/or material thickness of the front face. It is possible that the respective connecting device tapers to the rear and/or at its rear face is narrower than at its front face (for example with regard to its wall thickness and/or longitudinal extent). As a result, a shape or contour of the connecting devices which are appropriate to the load or adapted to the load may be expediently produced. The load generally corresponds to a substantially horizontal impact from the rear.

The reduction, tapering and/or narrowing may, in particular, be implemented by reducing the material and/or recessing the material of the connecting devices. It may take place, for example, in a stepwise or continuous manner.

The internal shape of the connecting devices is preferably adapted to the outer shape of the crossmember, so that a receiver space may be formed by the connecting devices for partially receiving the crossmember. The internal shape of the connecting devices is preferably adapted to the external shape of the crossmember, such that a receiver space may be formed by the connecting devices for partially receiving the crossmember.

The respective connecting device may preferably encase the crossmember in the peripheral direction of the crossmember, preferably over at least 180° or even substantially entirely.

The respective connecting device may comprise, for example, one of the following: a hollow profile, in particular a round or rectangular hollow profile, two shell parts and/or a substantially C-shaped or U-shaped profile.

The connecting devices preferably further serve for the releasable mounting on the crossmember.

The respective connecting device may be of integral or multipart design.

It should also be mentioned that the connecting devices may be mounted, for example, unreleasably (for example, by means of a welded connection) or releasably (for example by means of a screw connection) on the support arms.

The present disclosure is not limited to an underrun protection system but also encompasses a vehicle, in particular a utility vehicle, such as for example a heavy goods vehicle or an omnibus, and/or a trailer therefor, having an underrun protection system as disclosed above.

The embodiments and features of the present disclosure disclosed above are able to be combined together. Other advantageous developments of the present disclosure are disclosed in the subclaims or result from the following description of embodiments of the present disclosure in combination with the accompanying figures.

DETAILED DESCRIPTION

Figure 1:
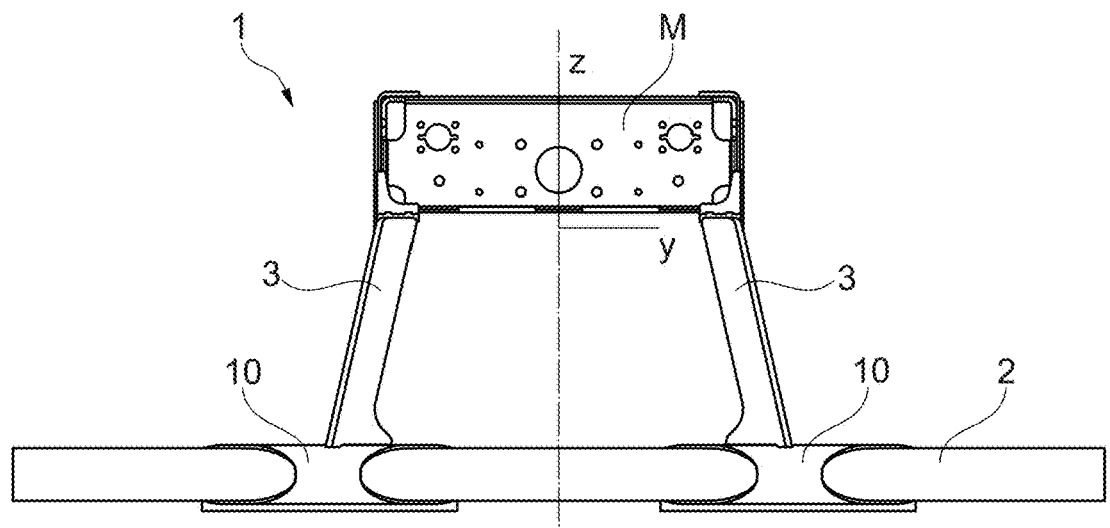
FIG. 1 shows a view of an underrun protection system according to an embodiment of the present disclosure from the rear.

The embodiments described with reference to the figures partially coincide so that similar or identical parts are provided with the same reference numerals and for the explanation thereof reference is also made to the description of the other embodiments in order to avoid repetition.

FIG. 1 shows a view from the rear of an underrun protection system 1 according to an embodiment of the present disclosure. The underrun protection system 1 serves for arranging on a rear of a vehicle K, shown highly schematically in FIGS. 2 and 3, preferably of a motor vehicle K, in particular of a heavy goods vehicle or omnibus.

Figure 2:
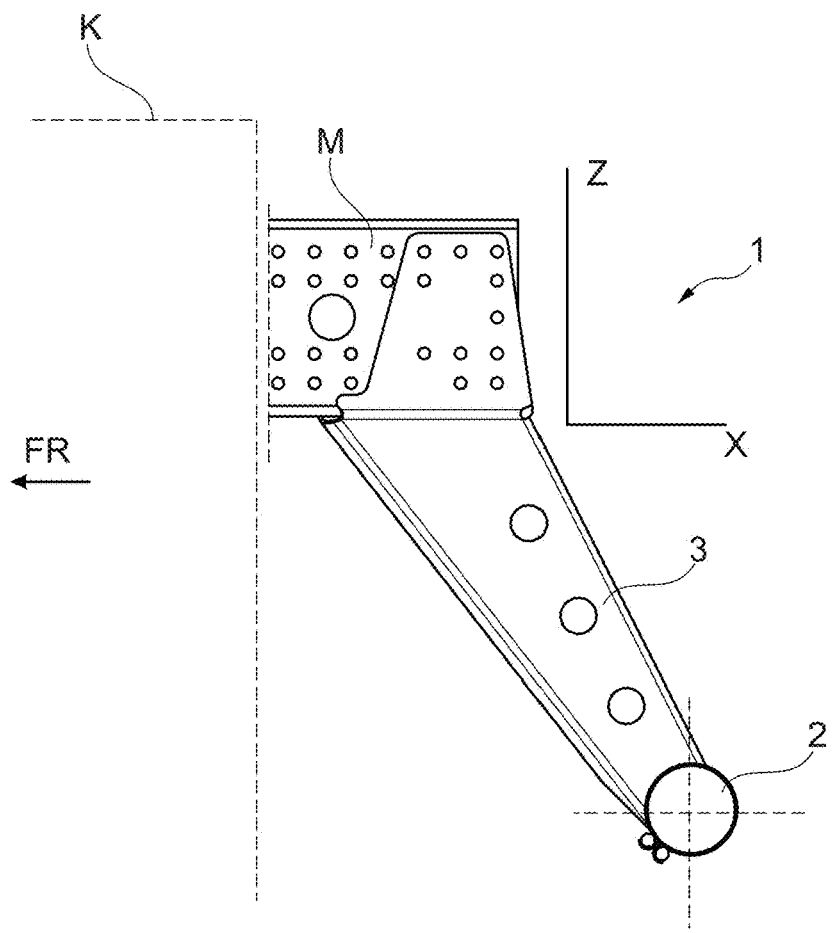
FIG. 2 shows a view of the underrun protection system of FIG. 1 from the side.
Figure 3:
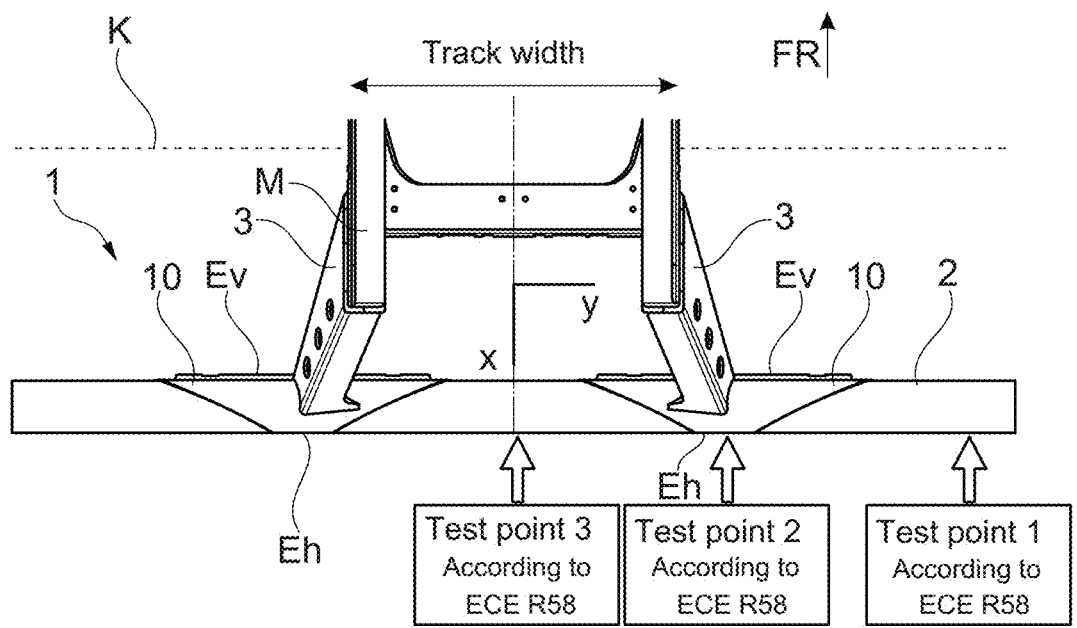
FIG. 3 shows a view of the underrun protection system of FIGS. 1 and 2 from above.

The underrun protection system 1 is described hereinafter by referring to FIGS. 1 to 3 together, wherein FIG. 2 shows a side view and FIG. 3 shows a view from above of the underrun protection system 1. The letters x, y, z symbolize in the conventional manner a coordinate system, wherein x identifies the longitudinal direction/axis of the motor vehicle K, y identifies the latitudinal direction/axis of the motor vehicle K and therefore the longitudinal direction/axis of the crossmember 2 and z identifies the vertical direction/axis of the motor vehicle K. The arrow FR identifies the forward direction of travel of the motor vehicle K.

In the event of a road traffic accident, the underrun protection system 1 is intended to prevent, in particular, smaller vehicles (for example passenger motor vehicles, two-wheeled vehicles, etc.) from travelling under the motor vehicle K from the rear, whereby there is a high risk for the occupants of the smaller vehicles of being seriously injured or even killed. The underrun protection system 1 is intended, in particular, to meet legal requirements, for example relative to ECE R58.

The underrun protection system 1 comprises a crossmember 2 and two support arms 3. The two support arms 3 serve for bearing the crossmember 2 and for mounting on a mounting structure M of the motor vehicle K. The mounting structure M is preferably a vehicle chassis, for example a longitudinal member or crossmember structure.

The two support arms 3 are preferably extended outwardly to the side (expediently at an angle to the xz-plane and/or in the y-direction) in particular such that the spacing of the support arms 3 at the bottom on the crossmember 2 is greater than the spacing of the support arms 3 at the top on the mounting structure M.

The support arms 3 are not only extended outwardly to the side but also to the rear (expediently at an angle to the yz-plane and/or in the x-direction).

The support arms 3 preferably extend between the mounting direction M and the crossmember 2 in a substantially linear-oblique manner.

The underrun protection system 1 also comprises two connecting devices 10. The connecting devices 10 serve for the expediently releasable mounting of the crossmember 2 on the support arms 3. The connecting devices 10 are designed as reinforcing parts for the partial mechanical reinforcement of the crossmember 2 and alternatively or additionally for the adjustability in the longitudinal direction of the crossmember 2. The connecting devices 10 thus permit an adjustment of the support arms 3 along the y-axis and thus in the longitudinal direction of the crossmember 2 so that the underrun protection system 1 may be used in motor vehicles K with different track widths. Alternatively or additionally, it is thereby possible to compensate for track width tolerances and/or additional fastening elements for built-on parts (for example superstructures, crane plates, etc.).

The connecting devices 10, in particular the contour thereof, are shaped geometrically such that the crossmember 2 is reinforced in a targeted manner, primarily in the relevant regions/testing points for the legally required test forces (for example ECE R58).

The respective connecting device 10 comprises a front face Ev and a rear face Eh, wherein a longitudinal extent (or alternatively or additionally a material thickness) of the rear face Eh is at least partially smaller than a longitudinal extent (or alternatively or additionally a material thickness) of the front face Ev. The respective connecting device 10 tapers, in particular, to the rear and is narrower on its rear face Eh than on its front face Ev. In the exemplary embodiment shown, the tapering and/or narrowing is implemented relative to the longitudinal extent of the connecting device 10, wherein a tapering and/or narrowing may also be implemented relative to the wall thickness of the connecting devices 10. The connecting devices 10 may, therefore, have a shape or contour adapted to the impact-load. The impact generally takes place substantially horizontally from the rear.

The internal shape of the connecting devices 10 is adapted to the external shape of the crossmember 2 so that, as a result, a receiver space is formed for partially receiving the crossmember 2. In the exemplary embodiment shown, the respective connecting device 10 is designed as a round hollow profile adapted to the load, wherein two shell parts, C-shaped profiles, U-shaped profiles etc. which are adapted to the load may be used. In the exemplary embodiment shown, the respective connecting device 10 encases the crossmember 2 in its peripheral direction over substantially the entire external periphery.

In FIG. 3 the testing points P1, P2 and P3 are additionally shown according to ECE R58.

Figure 4:
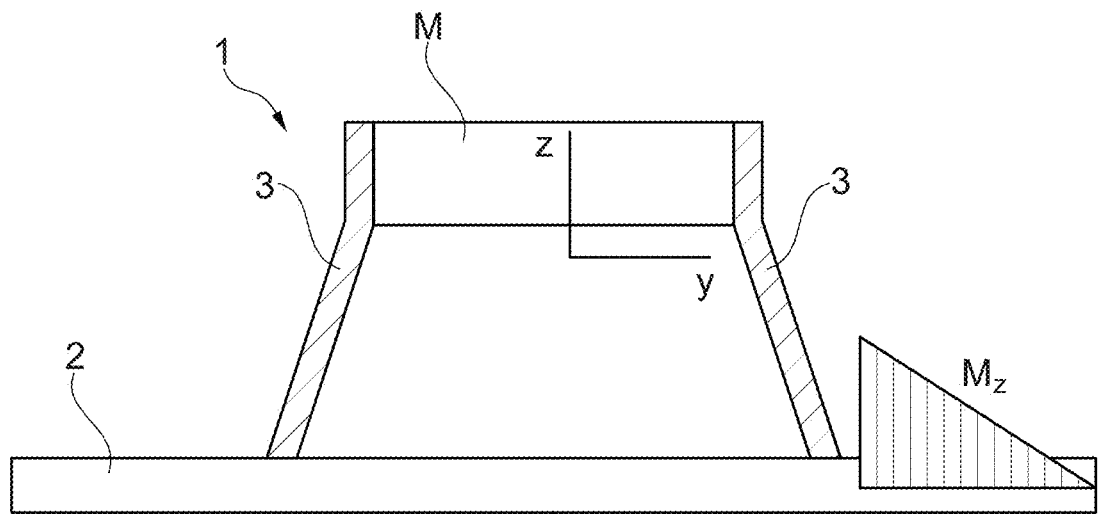
FIG. 4 shows a schematic view of a bending moment profile Mz on an underrun protection system according to an embodiment of the present disclosure.

FIG. 4 shows a bending moment profile Mz on an underrun protection system 1 which substantially corresponds to the underrun protection system 1 shown in FIGS. 1 to 3 but without the connecting devices 10 which lead to a further optimization of the bending moment profile Mz.

By the extension of the support arms 2 outwardly to the side, a reduced bending moment Mz may be achieved about the z-axis in the transition region between the crossmember 2 and the support arm 3, in particular as a result of a test force at the testing point P1 according to ECE R58.

As a result, a uniform improved utilization of the transverse member 2 may be possible, in particular with regard to the legally required test forces at legally required testing points P1 and P3 according to ECE R58.

The extension of the support arms 3 outwardly to the side and/or the reinforcing connecting devices 10 results, in particular, in an increased load-bearing capacity of the underrun protection system 1 relative to a test force at the testing point P1 and a reduced load-bearing capacity at the testing point P3.

Figure 5:
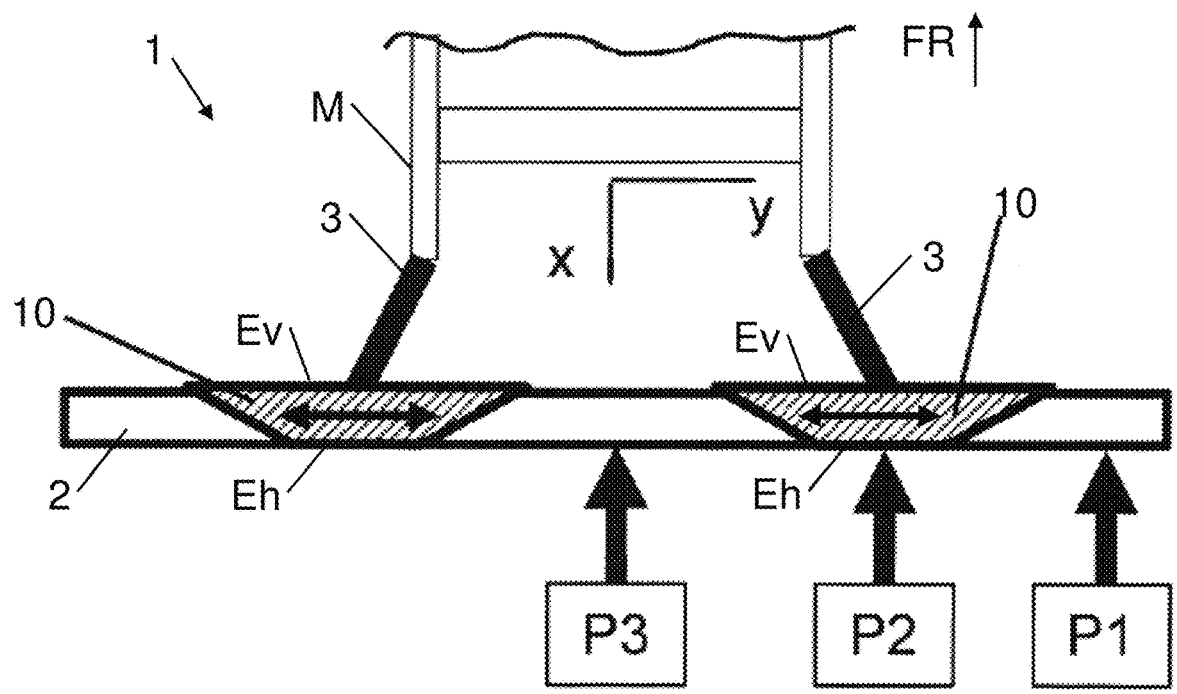
FIG. 5 shows a schematic view of an underrun protection system according to a further embodiment of the present disclosure from above.
Figure 6:
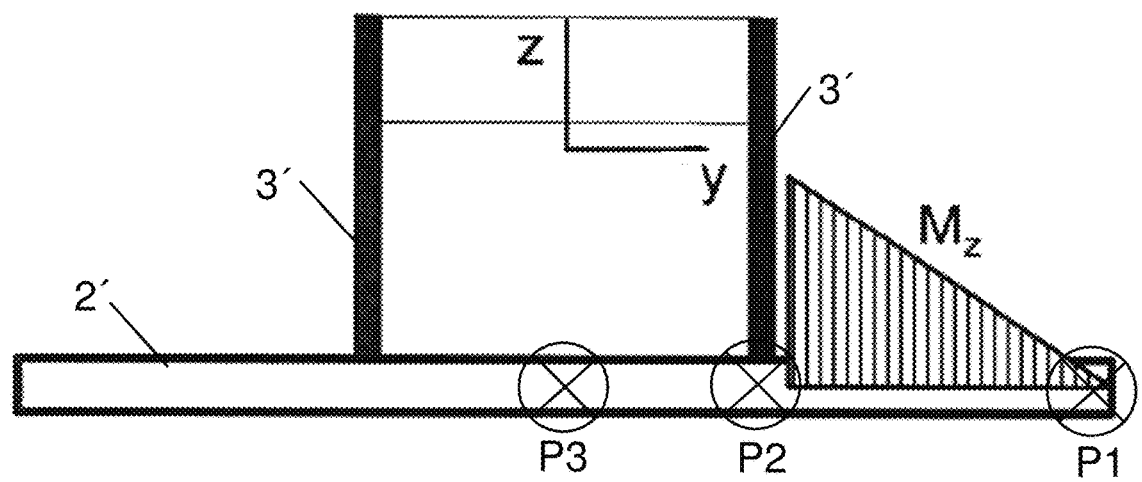
FIG. 6 shows a bending moment profile Mz on an underrun protection system according to the prior art.

FIG. 5 shows a schematic view of an underrun protection system 1 according to an embodiment of the present disclosure, wherein the underrun protection system 1 substantially corresponds to the underrun protection system 1 of FIGS. 1 to 3. The double arrows indicate the adjustability of the connecting devices 10 and thus of the support arms 3 along the crossmember 2.

The present disclosure is not limited to the embodiments described above. Instead, a plurality of variants and modifications which also make use of the inventive idea and therefore fall within the protected scope of the present disclosure are possible. Moreover, the present disclosure also claims protection for the subject and the features of the dependent claims, irrespective of the features and claims referred to therein.

LIST OF REFERENCE NUMERALS

1 Underrun protection system
2 Crossmember
3 Support arms
10 Connecting devices
M Mounting device
P1 Testing point
P2 Testing point
P3 Testing point
Eh Rear face
Ev Front face
x x-axis/direction
y y-axis/direction
z z-axis/direction
K Vehicle, preferably motor vehicle and/or trailer therefor
FR Forward direction of travel of the vehicle

The invention claimed is:

1. An underrun protection system for arranging on a rear of a vehicle, the underrun protection system comprising:
a crossmember and two support arms for supporting the crossmember and for mounting on a mounting structure of the vehicle; and
two connecting devices for mounting the crossmember on the support arms,
wherein the connecting devices serve as reinforcing parts for the partial reinforcement of the crossmember and/or the connecting devices are designed for adjustability along the crossmember,
wherein the respective connecting device has a front face and a rear face, wherein a longitudinal extent or material thickness of the rear face is at least partially smaller than a longitudinal extent or material thickness of the front face,
wherein the two support arms are extended outwardly to the side and a spacing of the support arms on the crossmember is greater than a spacing of the support arms on the mounting structure.

2. The underrun protection system according to claim 1, wherein the support arms are extended to the rear relative to the vehicle.

3. The underrun protection system according to claim 1, wherein the support arms extend downwardly from the mounting structure.

4. The underrun protection system according to claim 1, wherein the support arms extend obliquely between the crossmember and the mounting device.

5. The underrun protection system according to claim 1, wherein the respective connecting device tapers to the rear.

6. The underrun protection system according to claim 5, wherein it's a rear end of the respective connecting device is narrower than a front end of the respective connecting de-vice.

7. The underrun protection system according to claim 1, wherein an internal shape of the connecting devices is adapted to an external shape of the crossmember.

8. The underrun protection system according to claim 7, wherein a receiver space of the connecting devices is formed for partially receiving the crossmember.

9. The underrun protection system according to claim 1, wherein the respective connecting device encases the crossmember in its peripheral direction over at least 180° or substantially entirely.

10. The underrun protection system according to claim 1, wherein the respective connecting device comprises a hollow profile.

11. The underrun protection system according to claim 1, wherein the respective connecting device comprises two shell parts.

12. An underrun protection system for arranging on a rear of a vehicle, the underrun protection system comprising:
a crossmember and two support arms for supporting the crossmember and for mounting on a mounting structure of the vehicle; and
two connecting devices for mounting the crossmember on the support arms,
wherein the connecting devices serve as reinforcing parts for the partial reinforcement of the crossmember and/or the connecting devices are designed for adjustability along the crossmember,
wherein the respective connecting device has a front face and a rear face, wherein a longitudinal extent or material thickness of the rear face is at least partially smaller than a longitudinal extent or material thickness of the front face, wherein the respective connecting device comprises a C-shaped or U-shaped profile.

13. The underrun protection system according to claim 1, wherein the connecting devices are designed for the releasable mounting on the crossmember.

14. The underrun protection system according to claim 1, wherein the connecting devices are of integral or multipart design.

15. A vehicle comprising:
an underrun protection system for arranging on a rear of a vehicle, the underrun protection system comprising:
a crossmember and two support arms for supporting the crossmember and for mounting on a mounting structure of the vehicle; and
two connecting devices for mounting the crossmember on the support arms,
wherein the connecting devices serve as reinforcing parts for the partial re-inforcement of the crossmember and/or the connecting devices are designed for adjustability along the crossmember, wherein the respective connecting device has a front face and a rear face, wherein a longitudinal extent or material thickness of the rear face is at least partially smaller than a longitudinal extent or material thickness of the front face,
wherein the two support arms are extended outwardly to the side and a spacing of the support arms on the crossmember is greater than a spacing of the support arms on the mounting structure.

\* \* \* \* \*